United States Patent
Chen et al.

(10) Patent No.: US 10,360,324 B2
(45) Date of Patent: Jul. 23, 2019

(54) COMPUTER SIMULATION OF PHYSICAL PROCESSES

(75) Inventors: Hudong Chen, Newton, MA (US); Raoyang Zhang, Burlington, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 891 days.

(21) Appl. No.: 13/483,676

(22) Filed: May 30, 2012

(65) Prior Publication Data
US 2013/0151221 A1 Jun. 13, 2013

Related U.S. Application Data

(60) Provisional application No. 61/568,898, filed on Dec. 9, 2011.

(51) Int. Cl.
*G06F 17/50* (2006.01)

(52) U.S. Cl.
CPC ...... *G06F 17/5018* (2013.01); *G06F 2217/16* (2013.01)

(58) Field of Classification Search
CPC .................. G06F 2217/16; G06F 17/5018
USPC ............................................. 703/9
See application file for complete search history.

(56) References Cited

U.S. PATENT DOCUMENTS

| | | | |
|---|---|---|---|
| 5,640,335 A | 6/1997 | Molvig et al. | |
| 5,910,902 A | 6/1999 | Molvig et al. | |
| 5,953,239 A * | 9/1999 | Teixeira et al. | 703/6 |
| 6,089,744 A * | 7/2000 | Chen et al. | 703/2 |
| 7,558,714 B2 * | 7/2009 | Shan et al. | 703/9 |

FOREIGN PATENT DOCUMENTS

| | | |
|---|---|---|
| JP | 2010-500654 | 1/2010 |
| WO | WO 2008/021652 | 2/2008 |

OTHER PUBLICATIONS

Parmigiani, Andrea. "Lattice Boltzmann calculations of reactive multiphase flows in porous media.", Diss. No. Sc. 4287, University of Geneva, 2011.*
Zhang, Raoyang, Hongli Fan, and Hudong Chen. "A lattice Boltzmann approach for solving scalar transport equations." Philosophical Transactions of the Royal Society A: Mathematical, Physical and Engineering Sciences 369.1944 (2011): 2264-2273.*
Ladd, A. J. C., and R. Verberg. "Lattice-Boltzmann simulations of particle-fluid suspensions." Journal of Statistical Physics 104, No. 5-6 (2001): 1191-1251.*
Latt, Jonas, and Bastien Chopard. "Lattice Boltzmann method with regularized pre-collision distribution functions." Mathematics and Computers in Simulation 72, No. 2 (2006): 165-168.*
Nourgaliev, R. Robert, Truc-Nam Dinh, Theo G. Theofanous, and D. Joseph. "The lattice Boltzmann equation method: theoretical interpretation, numerics and implications." International Journal of Multiphase Flow 29, No. 1 (2003): 117-169.*

(Continued)

*Primary Examiner* — Aniss Chad
(74) *Attorney, Agent, or Firm* — Fish & Richardson P.C.

(57) ABSTRACT

A computer-implemented method for simulating fluid flow using a lattice Boltzmann (LB) approach and for solving scalar transport equations is described herein. In addition to the lattice Boltzmann functions for fluid flow, a second set of distribution functions is introduced for transport scalars.

48 Claims, 13 Drawing Sheets

(56) References Cited

OTHER PUBLICATIONS

Chen, Hudong et al., "Cellular automaton formulation of passive scalar dynamics," Phys. Fluids 30 (5), May 1997, pp. 1235-1237.

Chen, Hudong et al., "Digitial Physics Approach to Computational Fluid Dynamics: Some Basic Theoretical Features," International Journal of Modern Physics, 8, 4, (1997), 20 pages.

Chen, Hudong et al., "Extended-Boltzmann Kinetic Equation for Turbulent Flows," Science, vol. 301, No. 5633 (2003), pp. 633-636.

Chen, Hudong et al., "H-theorem and origins of instability in thermal lattice Boltzmann models," Computer Physics Communications 129 (2000), pp. 21-31.

Chen, Shiyi et al., "Lattice Boltzmann Method for Fluid Flows," Annual Review, Fluid Mech. 1998, 30: 329-364.

Clever, R.M., et al., "Transition to time-dependent convection," J. Fluid Mech. (1974), vol. 65, part 4, pp. 625-645.

He, Xiaoyi et al., "Lattice Boltzmann method on curvilinear coordinate system: Vortex shedding behind a circular cylinder," Physical Review E, vol. 56, No. 1, Jul. 1997, pp. 434-440.

International Search Report & Written Opinion, PCT/US2012/40121, dated Aug. 17, 2012, 12 pages.

Li, Yanbing et al., "Numerical study of flow past an impulsively started cylinder by the lattice-Boltzmann method," J. Fluid Mech. (2004), vol. 59, pp. 273-300.

Li, Yanbing et al., "Prediction of vortex shedding from a circular cylinder using a volumetric Lattice-Boltzmann boundary approach," Eur. Phys. J. Special Topics 171, (2009), pp. 91-97.

Parmigiani, Andrea, "Lattic Boltzmann Calculations of Reactive Multiphase Flows in Porous Media," PhD Thesis, University of Geneva, Published 2010, pp. 1, 3-4, 8-14, 18-19, 25, 27, 29, 38, 45-46, 52, 55-58, 73-74, 81, 86, 117.

Peng, Y. et al., "A 3D incompressible thermal lattice Boltzmann model and its application to simulate natural convection in a cubic cavity," Journal of Computational Physics 193 (2003), pp. 260-274.

Shan, Xiaowen, "Simulation of Rayleigh-Benard convection using a lattice Boltzmann method," Physical Review E, vol. 55, No. 3, Mar. 1997, pp. 2780-2788.

Waterson, N.P., et al., "Design principles for bounded higher-order convection schemes—a unified approach," Journal of Computational Physics 224 (2007), pp. 182-207.

Zhang, Raoyang et al., "A Lattice Boltzmann method for simulations of liquid-vapor thermal flows," Phys. Rev. E 67 066711 (2003), 19 pages.

Zhang, Raoyang et al., "Efficient kinetic method for fluid simulation beyond the Navier-Stokes equation," Phys. Rev, E 74, 046703 (2006), 7 pages.

Notification of Reasons for Rejection; JP Appln. No. 2014-545886; dated Jul. 6, 2016.

Inamura; Lattice Bolzmann Method—New Fluid simulation Method, Bussei Kenkyu (Materials research), Nov. 20, 2001, vol. 77, No. 2, pp. 197-232—English Translation to Follow.

Shima; Basic Study for Application of LBM to Material Movement in Concrete, Proceedings of the Japan Concrete Institute, Jun. 8, 2001; vol. 23, No. 2, pp. 817-822—English Translation to Follow.

\* cited by examiner

US 10,360,324 B2

COMPUTER SIMULATION OF PHYSICAL PROCESSES

CLAIM OF PRIORITY

This application claims priority under 35 USC § 119(e) to U.S. Provisional Patent Application Ser. No. 61/568,898, filed on Dec. 9, 2011 and entitled "COMPUTER SIMULATION OF PHYSICAL PROCESSES," the entire contents of which are hereby incorporated by reference.

TECHNICAL FIELD

This description relates to computer simulation of physical processes, such as fluid flow and acoustics.

BACKGROUND

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

SUMMARY

In general, this document describes techniques for simulating fluid flow using a lattice Boltzmann (LB) approach and for solving scalar transport equations. In the approaches described herein, in addition to the lattice Boltzmann functions for fluid flow, a second set of distribution functions is introduced for transport scalars. This approach fully recovers the macroscopic scalar transport equation satisfying an exact conservation law. It is numerically stable and scalar diffusivity does not have a CFL-like stability upper limit. With a sufficient lattice isotropy, numerical solutions are independent of grid orientations. A generalized boundary condition for scalars on arbitrary geometry is also realized by a precise control of surface scalar flux.

In one general aspect, a computer-implemented method for simulating a fluid flow on a computer, the method comprises simulating activity of a fluid in a volume, the activity of the fluid in the volume being simulated so as to model movement of elements within the volume; storing, in a computer accessible memory, a set of state vectors for voxels in the volume, each of the state vectors comprising a plurality of entries that correspond to particular momentum states of possible momentum states at a corresponding voxel; simulating a time evolution of a scalar quantity for the volume, with the simulation of the scalar quantity being based at least in part on the fluid flow and indirectly solving a macroscopic scalar transport equation; and storing, in the computer accessible memory, a set of scalar quantities for voxels in the volume, each of the scalar quantities comprising an entry that corresponds to the simulated scalar quantity at a corresponding voxel.

Implementations can include one or more of the following.

Simulating the fluid flow can include simulating the fluid flow based in part on a first set of discrete lattice speeds and simulating the time evolution of the scalar quantity can include simulating the time evolution of the scalar quantity based in part on a second set of discrete lattice speeds, the second set of discrete lattice speeds comprising fewer lattice speeds than the first set of discrete lattice speeds.

Simulating the fluid flow can include simulating the fluid flow based in part on a first set of discrete lattice speeds and simulating the time evolution of the scalar quantity can include simulating the time evolution of the scalar quantity based in part on a second set of discrete lattice speeds, the second set of discrete lattice speeds comprising the same lattice speeds than the first set of discrete lattice speeds.

Simulating the time evolution of the scalar quantity can include simulating the time evolution of the scalar quantity based in part on a collision operator in which only a first order non-equilibrium moment contributes to scalar diffusion.

Simulating the time evolution of the scalar quantity can include simulating the time evolution of the scalar quantity based in part on a collision operator that filters all non-equilibrium moments of second order and higher.

Simulating the time evolution of the scalar quantity can include collecting incoming distributions from neighboring cells; weighting the incoming distributions; applying a scalar algorithm to determine outgoing distributions; and propagating the determined outgoing distributions.

The method can also include applying a zero net surface flux boundary condition such that the incoming distributions are equal to the determined outgoing distributions.

Determining the outgoing distributions can include determining the outgoing distributions to provide a zero surface scalar flux.

The scalar quantity can be a scalar quantity selected from the group consisting of temperature, concentration, and density.

Solving the macroscopic scalar transport equation can include satisfying an exact invariance on uniformity of the scalar.

The macroscopic scalar transport equation can be $$\frac{\partial \rho T}{\partial t} + \nabla \cdot (\rho u T) = \nabla \cdot \rho \kappa \nabla T.$$

Simulating the time evolution of the scalar quantity can include simulating a particle distribution function.

Simulating the time evolution of the scalar quantity can include determining macroscopic fluid dynamics by solving mesoscopic kinetic equations based at least in part on the Boltzmann equation.

Simulating activity of the fluid in the volume can include performing interaction operations on the state vectors, the interaction operations modeling interactions between elements of different momentum states according to a model; and performing first move operations of the set of state vectors to reflect movement of elements to new voxels in the volume according to the model.

Simulating the time evolution of the scalar quantity can include satisfying a local energy conservation condition.

Satisfying the local energy conservation condition can include satisfying the local energy conservation condition in a fluid domain internal to the volume and at a boundary of the volume.

In some additional aspects, a computer program product tangibly embodied in a computer readable medium includes instructions that, when executed, simulate a physical process fluid flow. The computer program product is configured to cause a computer to simulate activity of a fluid in a volume to model movement of elements within the volume; store a set of state vectors for voxels in the volume, each of the state vectors comprising a plurality of entries that correspond to particular momentum states of possible momentum states at a corresponding voxel; simulate a time evolution of a scalar quantity for the volume, with the simulation of the scalar quantity being based at least in part on the fluid flow and indirectly solving a macroscopic scalar transport equation; and store a set of scalar quantities for voxels in the volume, each of the scalar quantities comprising an entry that corresponds to the simulated scalar quantity at a corresponding voxel.

Implementations can include one or more of the following.

Causing the computer to simulate the fluid flow can include causing the computer to simulate the fluid flow based in part on a first set of discrete lattice speeds and causing the computer to simulate the time evolution of the scalar quantity can include causing the computer to simulate the time evolution of the scalar quantity based in part on a second set of discrete lattice speeds, the second set of discrete lattice speeds comprising fewer lattice speeds than the first set of discrete lattice speeds.

Causing the computer to simulate the fluid flow can include causing the computer to simulate the fluid flow based in part on a first set of discrete lattice speeds and causing the computer to simulate the time evolution of the scalar quantity can include causing the computer to simulate the time evolution of the scalar quantity based in part on a second set of discrete lattice speeds, the second set of discrete lattice speeds comprising the same lattice speeds than the first set of discrete lattice speeds.

Causing the computer to simulate the time evolution of the scalar quantity can include causing the computer to simulate the time evolution of the scalar quantity based in part on a collision operator in which only a first order non-equilibrium moment contributes to scalar diffusion.

Causing the computer to simulate the time evolution of the scalar quantity can include causing the computer to simulate the time evolution of the scalar quantity based in part on a collision operator that filters all non-equilibrium moments of second order and higher.

Causing the computer to simulate the time evolution of the scalar quantity can include causing the computer to collect incoming distributions from neighboring cells; weight the incoming distributions; apply a scalar algorithm to determine outgoing distributions; and propagate the determined outgoing distributions.

The computer program product can be further configured to cause a computer to apply a zero net surface flux boundary condition such that the incoming distributions are equal to the determined outgoing distributions.

Causing the computer to determine the outgoing distributions can include causing the computer to determine the outgoing distributions to provide a zero surface scalar flux.

The scalar quantity can be a scalar quantity selected from the group consisting of temperature, concentration, and density.

Causing the computer to solve the macroscopic scalar transport equation can include causing the computer to satisfy an exact invariance on uniformity of the scalar.

The macroscopic scalar transport equation can be $$\frac{\partial \rho T}{\partial t} + \nabla \cdot (\rho u T) = \nabla \cdot \rho \kappa \nabla T.$$

Causing the computer to simulate the time evolution of the scalar quantity can include causing the computer to simulate a particle distribution function.

Causing the computer to simulate the time evolution of the scalar quantity can include causing the computer to determine macroscopic fluid dynamics by solving mesoscopic kinetic equations based at least in part on the Boltzmann equation.

Causing the computer to simulate activity of the fluid in the volume can include causing the computer to perform interaction operations on the state vectors, the interaction operations modeling interactions between elements of different momentum states according to a model; and perform first move operations of the set of state vectors to reflect movement of elements to new voxels in the volume according to the model.

Causing the computer to simulate the time evolution of the scalar quantity can include causing the computer to satisfy a local energy conservation condition.

Causing the computer to satisfy the local energy conservation condition can include causing the computer to satisfy the local energy conservation condition in a fluid domain internal to the volume and at a boundary of the volume.

In some aspects, a computer system for simulating a physical process fluid flow, is configured to simulate activity of a fluid in a volume to model movement of elements within the volume; store a set of state vectors for voxels in the volume, each of the state vectors comprising a plurality of entries that correspond to particular momentum states of possible momentum states at a corresponding voxel; simulate a time evolution of a scalar quantity for the volume, with the simulation of the scalar quantity being based at least in part on the fluid flow and indirectly solving a macroscopic scalar transport equation; and store a set of scalar quantities for voxels in the volume, each of the scalar quantities comprising an entry that corresponds to the simulated scalar quantity at a corresponding voxel.

Implementations can include one or more of the following.

The configurations to simulate the fluid flow can include configurations to cause the system to simulate the fluid flow based in part on a first set of discrete lattice speeds; and the configurations to simulate the time evolution of the scalar quantity can include configurations to simulate the time evolution of the scalar quantity based in part on a second seta discrete lattice speeds, the second set of discrete lattice speeds comprising fewer lattice speeds than the first set of discrete lattice speeds.

The configurations to simulate the fluid flow can include configurations to simulate the fluid flow based in part on a first set of discrete lattice speeds; and the configurations simulate the time evolution of the scalar quantity can include configurations to simulate the time evolution of the scalar quantity based in part on a second set of discrete lattice speeds, the second set of discrete lattice speeds comprising the same lattice speeds than the first set of discrete lattice speeds.

The configurations to simulate the time evolution of the scalar quantity can include configurations to simulate the time evolution of the scalar quantity based in part on a collision operator in which only a first order non-equilibrium moment contributes to scalar diffusion.

The configurations to simulate the time evolution of the scalar quantity can include configurations to simulate the time evolution of the scalar quantity based in part on a collision operator that filters all non-equilibrium moments of second order and higher.

The configurations to simulate the time evolution of the scalar quantity can include configurations to collect incoming distributions from neighboring cells; weight the incoming distributions; apply a scalar algorithm to determine outgoing distributions; and propagate the determined outgoing distributions.

The system can be further configured to apply a zero net surface flux boundary condition such that the incoming distributions are equal to the determined outgoing distributions.

The configurations to determine the outgoing distributions can include configurations to determine the outgoing distributions to provide a zero surface scalar flux.

The scalar quantity can be a scalar quantity selected from the group consisting of temperature, concentration, and density.

The configurations to solve the macroscopic scalar transport equation can include configurations to satisfy an exact invariance on uniformity of the scalar.

The macroscopic scalar transport equation can be $$\frac{\partial \rho T}{\partial t} + \nabla \cdot (\rho u T) = \nabla \cdot p\kappa \nabla T.$$

The configurations to simulate the time evolution of the scalar quantity can include configurations to simulate a particle distribution function.

The configurations to simulate the time evolution of the scalar quantity can include configurations to determine macroscopic fluid dynamics by solving mesoscopic kinetic equations based at least in part on the Boltzmann equation.

The configurations to simulate activity of the fluid in the volume can include configurations to perform interaction operations on the state vectors, the interaction operations modeling interactions between elements of different momentum states according to a model; and perform first move operations of the set of state vectors to reflect movement of elements to new voxels in the volume according to the model.

The configurations to simulate the time evolution of the scalar quantity can include configurations to satisfy a local energy conservation condition. The configurations to satisfy the local energy conservation condition can include configurations to satisfy the local energy conservation condition in a fluid domain internal to the volume and at a boundary of the volume.

Implementations of the techniques discussed above may include a method or process, a system or apparatus, or computer software on a computer-accessible medium.

The systems and techniques may be implemented using a lattice gas simulation that employs a Lattice Boltzmann formulation. The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

In an enhanced system, the state vector at each lattice site includes many more bits (e.g., 54 bits for subsonic flow) to provide variation in particle energy and movement direction, and collision rules involving subsets of the full state vector are employed. In a further enhanced system, more than a single particle is permitted to exist in each momentum state at each lattice site, or voxel (these two terms are used interchangeably throughout this document). For example, in an eight-bit implementation, 0-255 particles could be moving in a particular direction at a particular voxel. The state vector, instead of being a set of bits, is a set of integers (e.g., a set of eight-bit bytes providing integers in the range of 0 to 255), each of which represents the number of particles in a given state.

In a further enhancement, Lattice Boltzmann Methods (LBM) use a mesoscopic representation of a fluid to simulate 3D unsteady compressible turbulent flow processes in complex geometries at a deeper level than possible with conventional computational fluid dynamics ("CFD") approaches. A brief overview of LBM method is provided below.

Boltzmann-Level Mesoscopic Representation

It is well known in statistical physics that fluid systems can be represented by kinetic equations on the so-called "mesoscopic" level. On this level, the detailed motion of individual particles need not be determined. Instead, properties of a fluid are represented by the particle distribution functions defined using a single particle phase space, $f=f(x,v,t)$, where x is the spatial coordinate while v is the particle velocity coordinate. The typical hydrodynamic quantities, such as mass, density, fluid velocity and temperature, are simple moments of the particle distribution function. The dynamics of the particle distribution functions obeys a Boltzmann equation:

$$\partial_t f + v\nabla_x f + F(x,t)\nabla_v f = C\{f\}, \quad \text{Eq. (1)}$$

where F(x,t) represents an external or self-consistently generated body-force at (x,t). The collision term C represents interactions of particles of various velocities and locations. It is important to stress that, without specifying a particular form for the collision term C, the above Boltzmann equation is applicable to all fluid systems, and not just to the well-known situation of rarefied gases (as originally constructed by Boltzmann).

Generally speaking, C includes a complicated multi-dimensional integral of two-point correlation functions. For the purpose of forming a closed system with distribution functions $f$ alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f^{eq}(x,v,t)\}$ via collisions:

$$C = -\frac{1}{\tau}(f - f^{eq}),\qquad\text{Eq.(2)}$$

where the parameter τ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force. Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\in\{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x,v,t)$, it is only necessary to track a finite set of discrete distributions, $f_i(x,t)$ with the subscript labeling the discrete velocity indices. The key advantage of dealing with this kinetic equation instead of a macroscopic description is that the increased phase space of the system is offset by the locality of the problem.

Due to symmetry considerations, the set of velocity values are selected in such a way that they form certain lattice structures when spanned in the configuration space. The dynamics of such discrete systems obeys the LBE having the form $f_i(x+c_i,t+1)-f_i(x,t)=C_i(x,t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined as:

$$\rho(x, t) = \sum_i f_i(x, t);\qquad\text{Eq.(3)}$$

$$\rho u(x, t) = \sum_i c_i f_i(x, t);$$

$$DT(x, t) = \sum_i (c_i - u)^2 f_i(x, t),$$

where ρ, u, and T are, respectively, the fluid density, velocity and temperature, and D is the dimension of the discretized velocity space (not at all equal to the physical space dimension).

Other features and advantages will be apparent from the following description, including the drawings, and the claims.

DESCRIPTION

Figure 1:
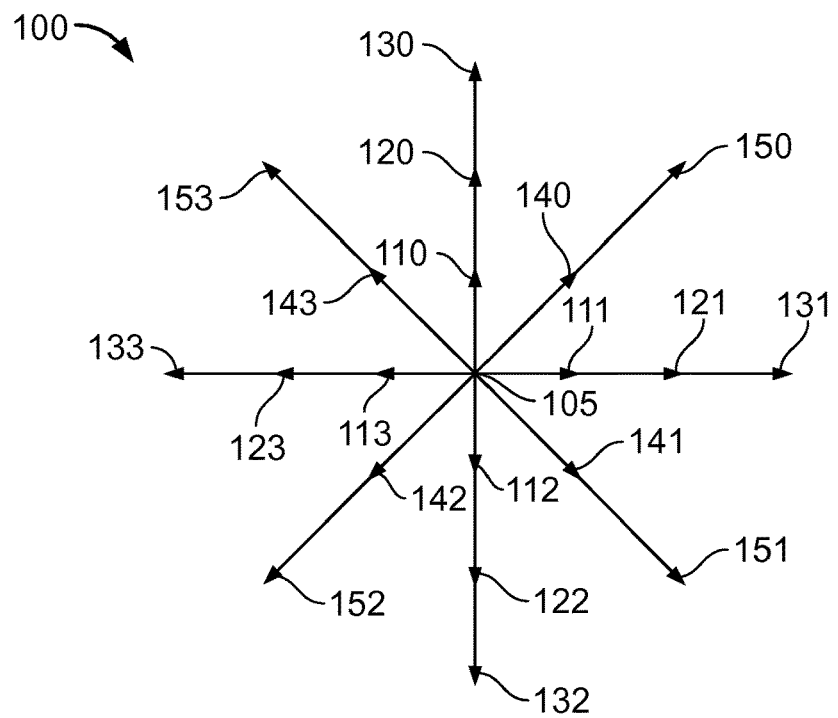
FIGS. 1 and 2 illustrate velocity components of two LBM models.

A. Approach to Solving for Scalar Quantities

When completing complex fluid flow simulations it can be beneficial to concurrently solve scalar quantities such as temperature distribution, concentration distribution, and/or density in conjunction with solving for the fluid flow.

In the systems and methods described herein, modeling of the scalar quantities (as opposed to vector quantities) is coupled with the modeling of the fluid flow based on a LBM-based physical process simulation system. Exemplary scalar quantities that can be simulated include temperature, concentration, and density.

For example, the system can be used to determine a convective temperature distribution within a system. For example, if a system (formed of a volume represented by multiple voxels) includes a source of heat and there is air flow within the system, some areas of the system will be warmer than others based on the air flow and proximity to the heat source. In order to model such a situation, the temperature distribution within the system can be represented as a scalar quantity with each voxel having an associated temperature.

In another example, the system can be used to determine a chemical distribution within a system. For example, if the system (formed of the volume represented by multiple voxels) includes a source of a contaminant such as a dirty bomb or chemical or other particulate suspended in either air or liquid and there is air or liquid flow within the system, some areas of the system will have a higher concentration than others based on the flow and proximity to the source. In order to model such a situation, the chemical distribution within the system can be represented as a scalar quantity with each voxel having an associated concentration.

In some applications, multiple different scalar quantities can be simulated concurrently. For example, the system can simulate both a temperature distribution and a concentration distribution in a system.

The scalar quantities may be modeled in different ways. For example, a lattice Boltzmann (LB) approach for solving scalar transport equations can be used to indirectly solve for scalar transport. For example, the methods described herein can provide an indirect solution of the following second order macroscopic scalar transport equation $$\frac{\partial \rho T}{\partial t} + \nabla \cdot (\rho u T) = \nabla \cdot \rho \kappa \nabla T.$$

In such arrangement simulation, in addition to the lattice Boltzmann functions for fluid flow, a second set of distribution functions is introduced for transport scalars. This approach assigns a vector to each voxel in a volume to represent the fluid flow and a scalar quantity to each voxel in the volume to represent the desired scalar variable (e.g., temperature, density, concentration, etc.). This approach fully recovers the macroscopic scalar transport equation satisfying an exact conservation law. This approach is believed to increase the accuracy of the determined scalar quantities in comparison to other, non-LBM methods. Additionally, this approach is believed to provide enhanced capability to account for complicated boundary shapes.

This approach for modeling scalar quantities may be used in conjunction with a time-explicit CFD/CAA solution method based on the Lattice Boltzmann Method (LBM), such as the PowerFLOW system available from Exa Corporation of Burlington, Mass. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A general discussion of a LBM-based simulation system is provided below and followed by a discussion of a scalar solving approach that may be used in conjunction with fluid flow simulations to support such a modeling approach.

B. Model Simulation Space

In a LBM-based physical process simulation system, fluid flow may be represented by the distribution function values $f_i$, evaluated at a set of discrete velocities $c_i$. The dynamics of the distribution function is governed by Equation 4 where $f_i(0)$ is known as the equilibrium distribution function, defined as:

$$f_\alpha^{(0)} = w_\alpha \rho \left[ 1 + u_\alpha \left| \frac{u_\alpha^2 - u^2}{2} \right| \frac{u_\alpha(u_\alpha^2 - 3u^2)}{6} \right] \qquad \text{Eq.(4)}$$

where $$u_\alpha = \frac{c_i u}{T}.$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass p and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
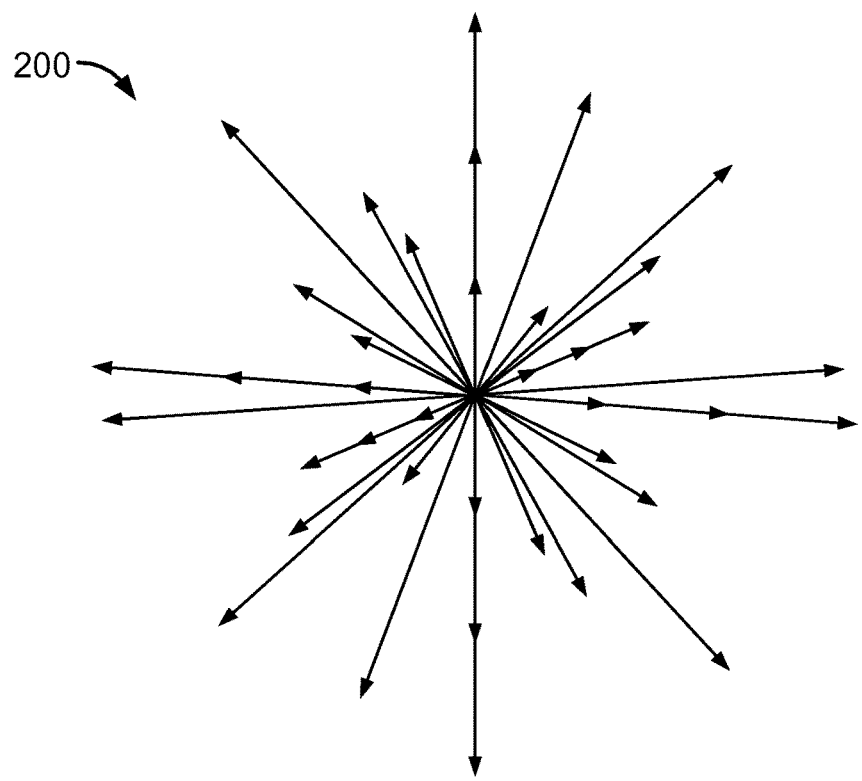

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
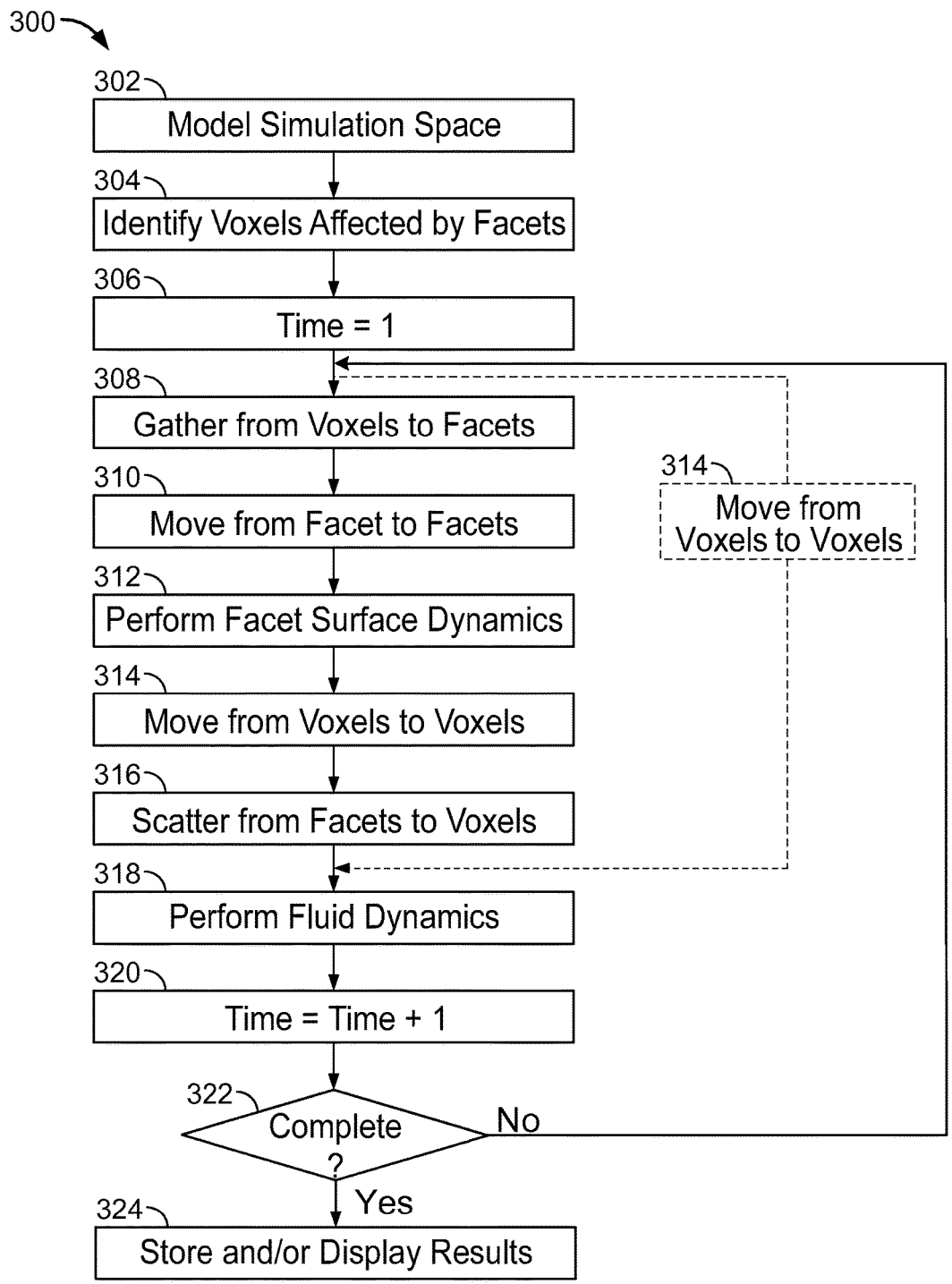
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$\text{Re} = uL/v. \qquad \text{Eq. (5)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z}) \qquad \text{Eq. (6)}$$

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
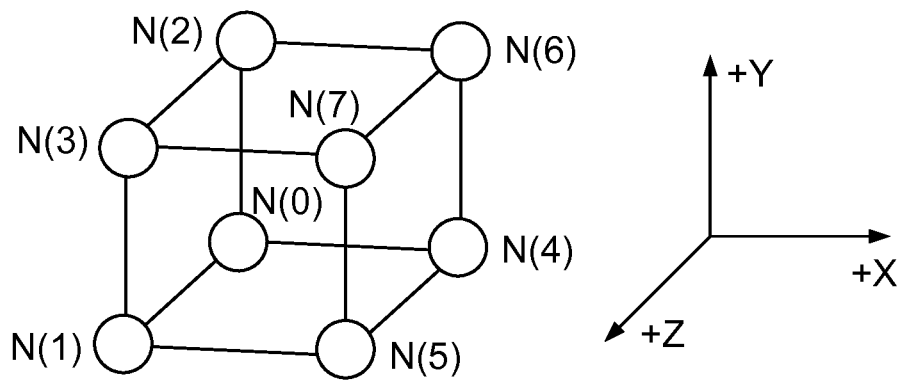
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 4.

Figure 5A:
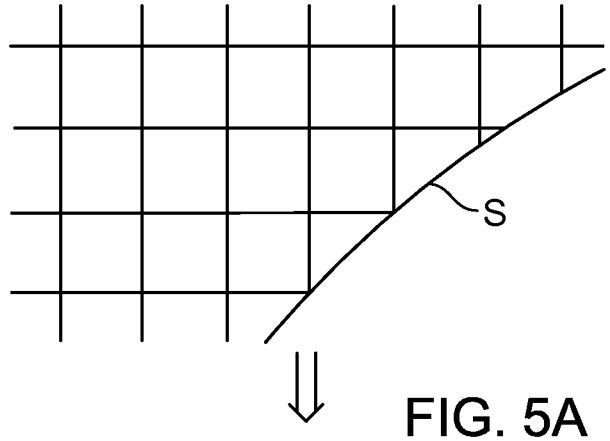
FIGS. 5A and 5B are illustrations of lattice structures used by the system of FIG. 3.
Figure 5B:
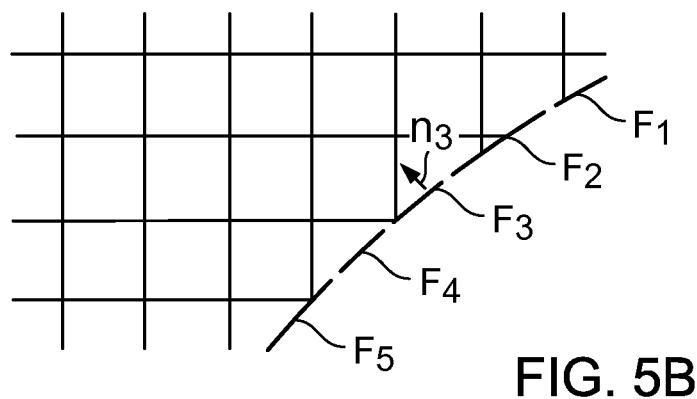

Referring to FIGS. 5A and 5B, a surface S (FIG. 3A) is represented in the simulation space (FIG. 5B) as a collection of facets $F_\alpha$:

$$S = \{F_\alpha\} \qquad \text{Eq. (7)}$$

where $\alpha$ is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
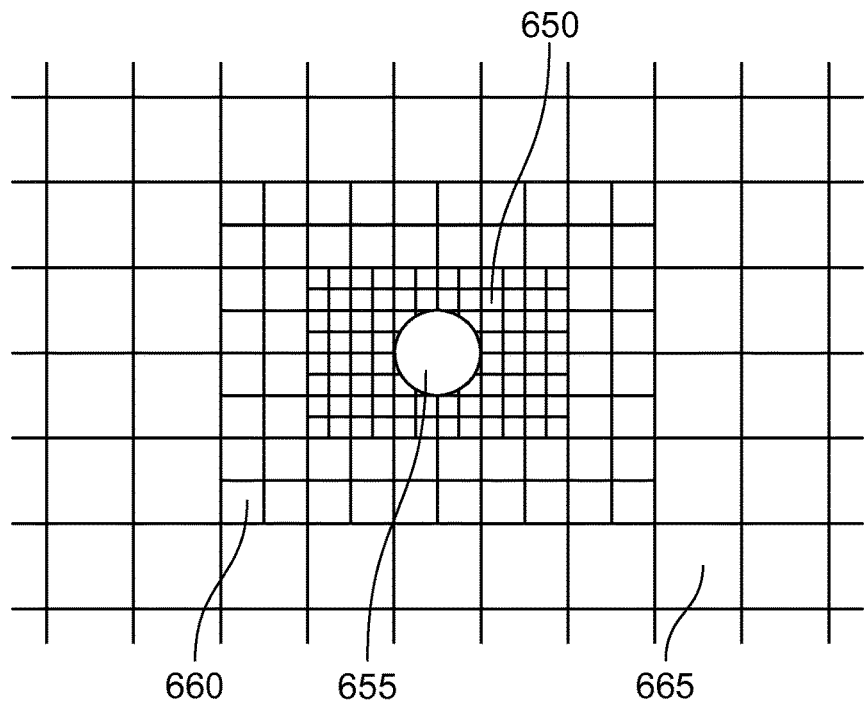
FIGS. 6 and 7 illustrate variable resolution techniques.
Figure 7:
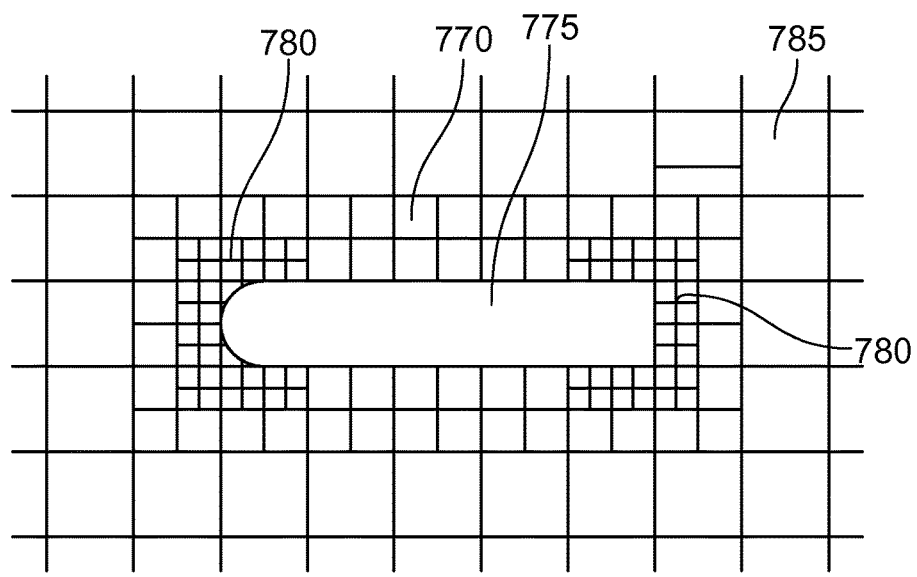

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected By Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
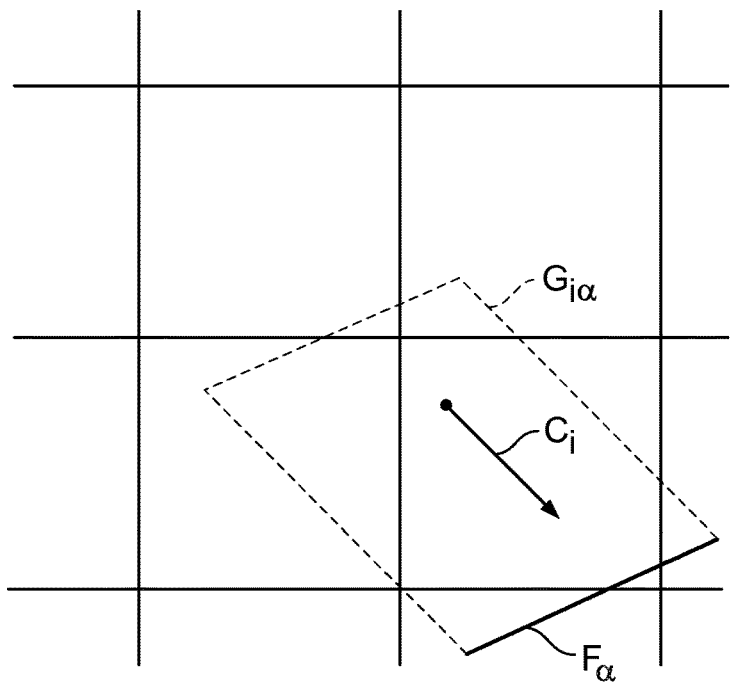
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \qquad \text{Eq. (8)}$$

The facet $F_\alpha$ receives particles from the volume $V_{i\alpha}$ when the velocity vector of the state is directed toward the facet ($|c_i n_i| > 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x). \qquad \text{Eq. (9)}$$

When the parallelepiped $G_{i\alpha}$ is intersected by one or more facets, the following condition is true:

$$V_{i\alpha} = \Sigma V_\alpha(x) + \Sigma V_{i\alpha}(\beta) \qquad \text{Eq. (10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq. (11)}$$

D. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel $N(x)$ and a facet $F_\alpha$ is:

$$\Gamma_{i\alpha}(x) = N_i(x) V_{i\alpha}(x). \qquad \text{Eq. (12)}$$

From this, for each state i directed toward a facet $F_\alpha(c_i n_\alpha < 0)$, the number of particles provided to the facet $F_\alpha$ by the voxels is:

$$\Gamma_{i\alpha V \to F} = \sum_x \Gamma_{i\alpha}(x) = \sum_x N_i(x) V_{i\alpha}(x) \qquad \text{Eq.(13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 10:
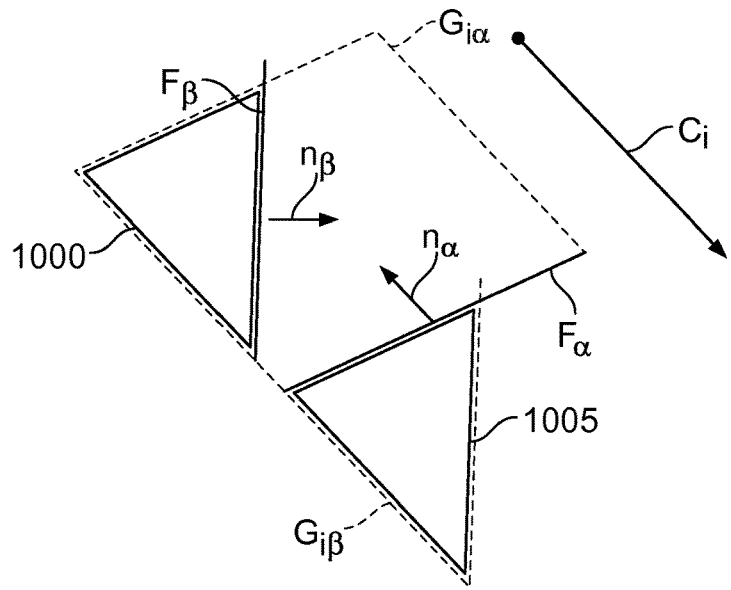
FIG. 10 illustrates movement of particles from a surface to a surface.

Next, particles are moved between facets (step 310). If the parallelepiped $G_{i\alpha}$ for an incoming state $(c_i n_\alpha < 0)$ of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) / V_{i\alpha}, \qquad \text{Eq. (14)}$$

where $\Gamma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1) V_{i\alpha}(\beta) / V_{i\alpha} \qquad \text{Eq.(15)}$$

and the total flux of state i particles into the facet is:

$$\Gamma_{iIN}(\alpha) = \qquad \text{Eq.(16)}$$
$$\Gamma_{i\alpha V \to F} + \Gamma_{i\alpha F \to F} = \sum_x N_i(x) V_{i\alpha}(x) + \sum_\beta \Gamma_i(\beta, t-1) V_{i\alpha}(\beta) / V_{i\alpha}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha) = \Gamma_{iIN}(\alpha) / V_{i\alpha}, \qquad \text{Eq. (17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V \qquad \text{Eq. (18)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \qquad \text{Eq. (19)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
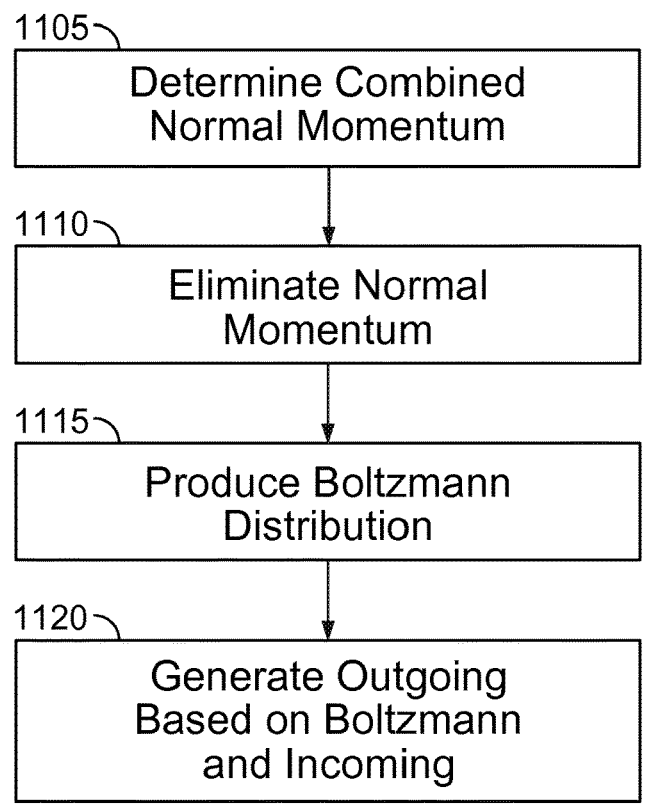
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \qquad \text{Eq.(20)}$$

for all i. From this, the normal momentum $P_n(\alpha)$ is determined as:

$$P_n(\alpha) = n_\alpha \cdot P(\alpha). \qquad \text{Eq. (21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha) V_{i\alpha}. \qquad \text{Eq. (22)}$$

Using this difference, the outgoing flux distribution is:

$$\Gamma_{iOUT}(\alpha) = N_{n-\beta i}(\alpha) V_{i\alpha} - \Delta\Gamma_{i*}(\alpha), \qquad \text{Eq. (23)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = N_{n-Bi}(\alpha) V_{i\alpha} - \Delta\Gamma_{i*}(\alpha) + C_f(n_\alpha \cdot c_i)[N_{n-Bi*}(\alpha) - N_{n-Bi}(\alpha)] V_{i\alpha} + (n_\alpha \cdot c_i)(t_{i\alpha} \cdot c_i) \Delta N_{j,1} V_{i\alpha} + (n_\alpha \cdot c_i) (t_{2\alpha} \cdot c_i) \Delta N_{j,2} V_{i\alpha}, \qquad \text{Eq. (24)}$$

for $n_\alpha c_i > 0$, where $C_f$ is a function of skin friction, $t_{i\alpha}$ is a first tangential vector that is perpendicular to $n_\alpha$, $t_{2\alpha}$, is a second tangential vector that is perpendicular to both $n_\alpha$ and $t_{i\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right) \qquad \text{Eq.(25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha) n_\alpha)/\rho, \qquad \text{Eq. (26)}$$

where ρ is the density of the facet distribution:

$$\rho = \sum_i N_i(\alpha) \qquad \text{Eq.(27)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha) V_{i\alpha}. \qquad \text{Eq. (28)}$$

The outgoing flux distribution then becomes:

$$\Gamma_{iOUT}(\alpha) = N_{n-\beta i}(\alpha) V_{i\alpha} - \Delta\Gamma_{i*}(\alpha) + C_f(n_\alpha c_i)[N_{n-\beta i*}(\alpha) - N_{n-\beta i}(\alpha)] V_{i\alpha}, \qquad \text{Eq. (29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i, c_i \cdot n_\alpha > 0} c_i \Gamma_{i\alpha OUT} - \sum_{i, c_i \cdot n_\alpha < 0} c_i \Gamma_{i\alpha IN} = p_\alpha n_\alpha A_\alpha - C_f p_\alpha u_\alpha A_\alpha \qquad \text{Eq.(30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i, c_{ji} \cdot n_\alpha < 0} \Gamma_{\alpha jiIN} - \sum_{i, c_{ji} \cdot n_\alpha > 0} \Gamma_{\alpha jiOUT} \qquad \text{Eq.(31)}$$

where the index j denotes the energy of the state i. This energy difference is then used to generate a difference term:

$$\delta\Gamma_{\alpha ji} = V_{i\alpha} \Delta\Gamma_{\alpha mj} \bigg/ \sum_{i, c_{ji} \cdot n_\alpha < 0} V_{i\alpha} \qquad \text{Eq.(32)}$$

for $c_{ji} n_\alpha > 0$. This difference term is used to modify the outgoing flux so that the flux becomes:

$$\Gamma_{\alpha jiOUTf} = \Gamma_{\alpha jiOUT} + \delta\Gamma_{\alpha ji} \qquad \text{Eq. (33)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
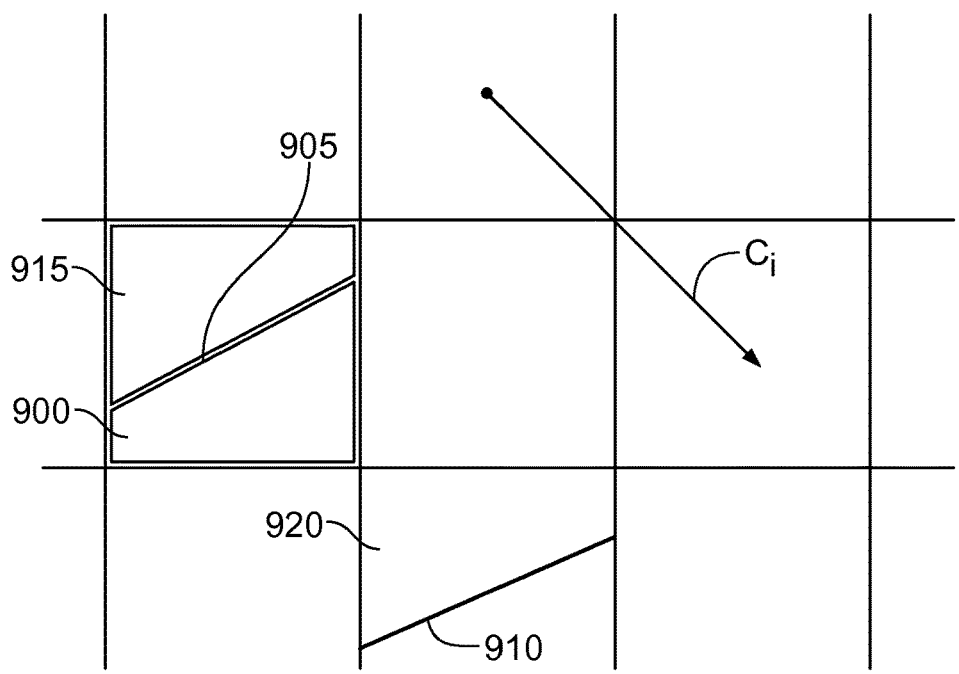
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \quad \text{Eq.(34)}$$

where N(x) is the source voxel.

6. Scatter from Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha iF \to V} = \frac{1}{P_f(x)} V_{\alpha i}(x) \Gamma_{\alpha iOUT_f} / V_{\alpha i} \quad \text{Eq.(35)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha iOUT_f} / V_{\alpha i} \quad \text{Eq.(36)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Variable Resolution

Figure 12:
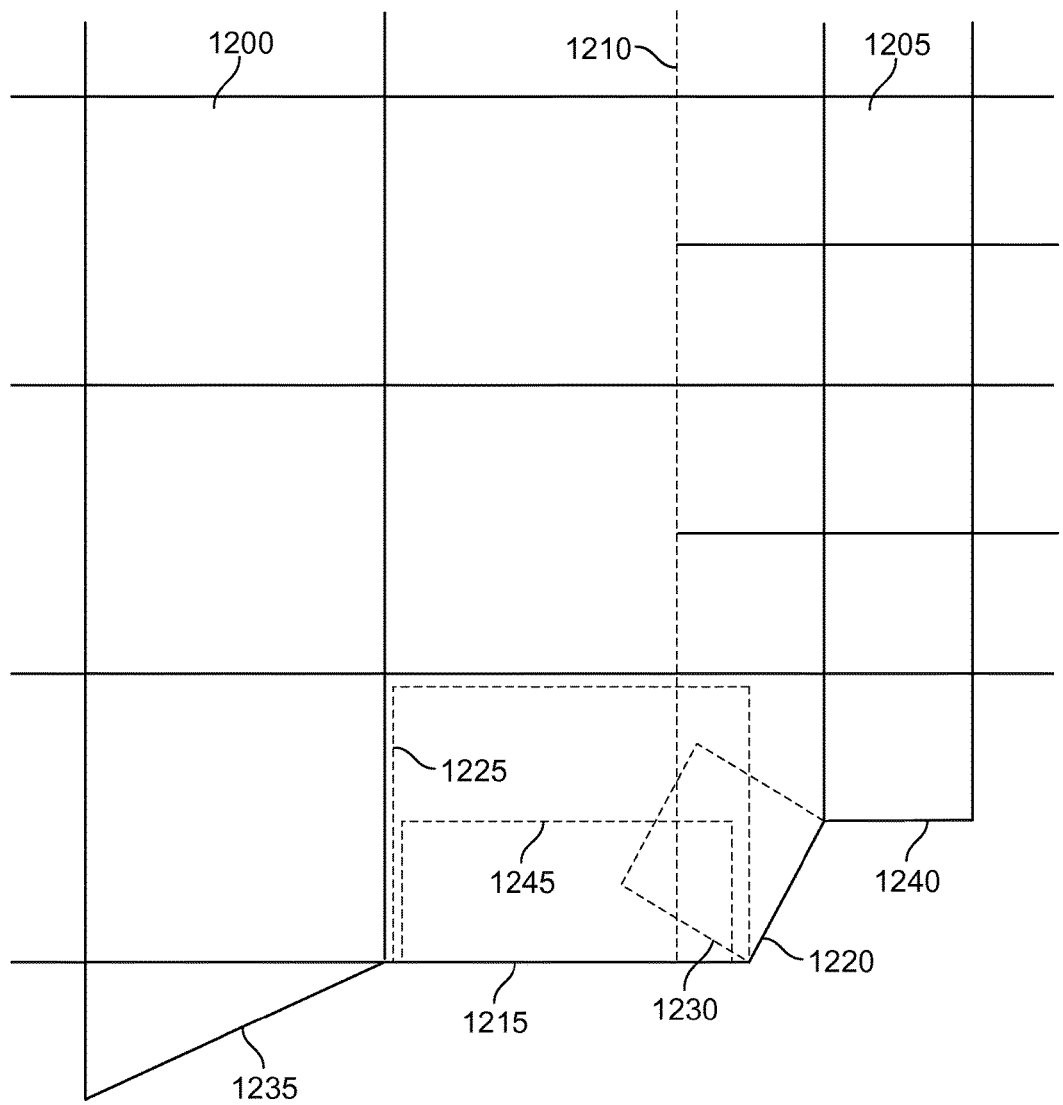
FIG. 12 illustrates an interface between voxels of different sizes.

Referring to FIG. 12, variable resolution (as illustrated in FIGS. 6 and 7 and discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 13:
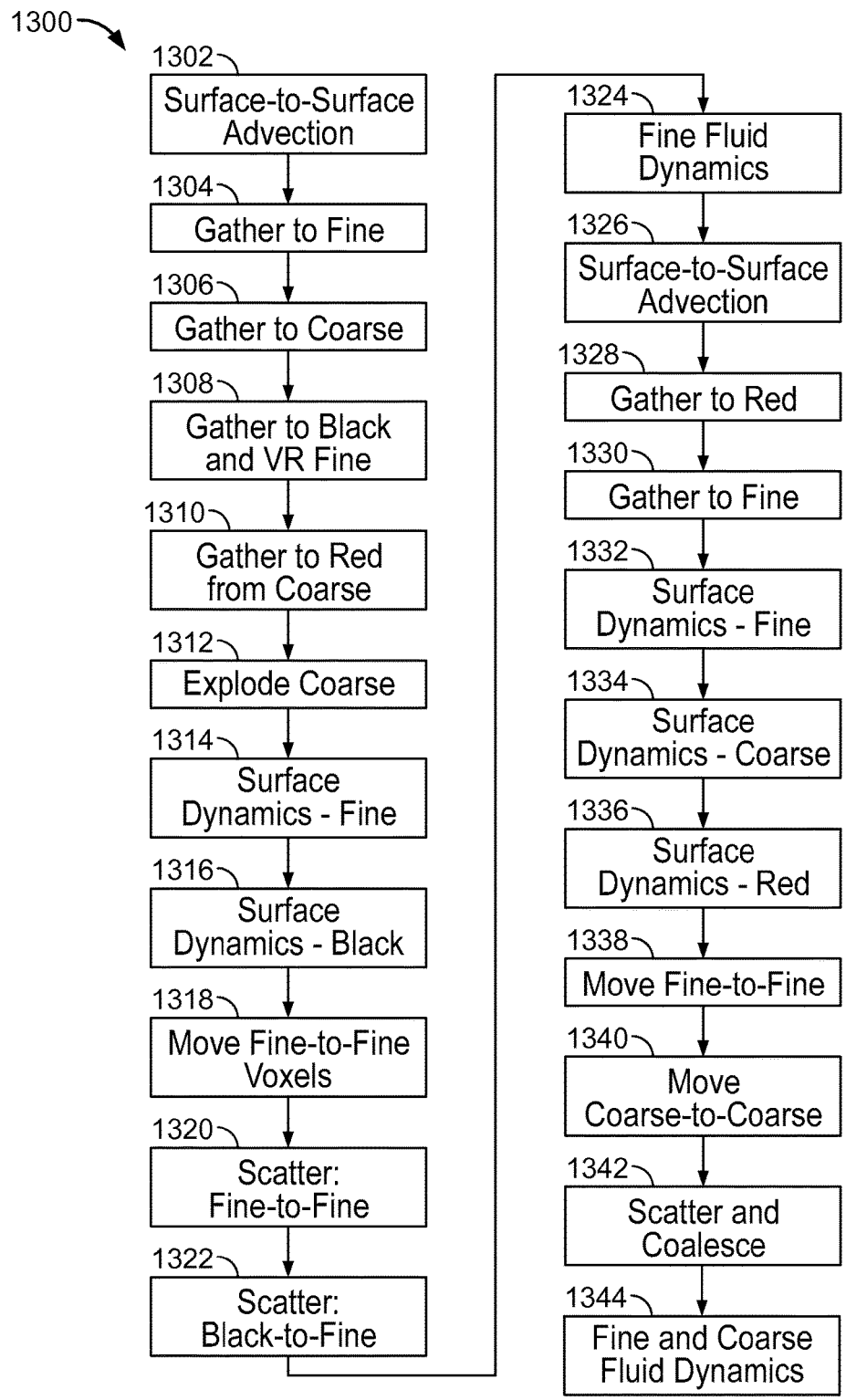
FIG. 13 is a flow chart of a procedure for simulating interactions with facets under variable resolution conditions.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i n_\alpha| A_\alpha. \qquad \text{Eq. (37)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha Rb}$ and for VR fine facets $F_{\alpha IF}$ from both coarse and fine voxels using fine parallelepipeds (step 1308). Finally, particles are gathered for red facets $F_{\alpha IRr}$ from coarse voxels using the differences between coarse parallelepipeds and fine parallelepipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{\alpha ICb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1320).

Particles are also scattered from the black facets $F_{\alpha ICb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{\alpha IRr}$ from fine voxels using fine parallelepipeds (step 1328). Particles also are gathered for fine facets $F_{\alpha F}$ and $F_{\alpha IF}$ from fine voxels using fine parallelepipeds (step 1330).

Thereafter, surface dynamics are performed for the fine facets $F_{\alpha IF}$ and $F_{\alpha F}$ (step 1332), for the coarse facets $F_{\alpha C}$ (step 1134), and for the red facets $F_{\alpha ICr}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

F. Scalar Transport Solver

As noted above, various types of LBM may be applied for solving fluid flows, which serve as the background carrier for scalar transport. During the simulation, both fluid flow and scalar transport are simulated. For example, the fluid flow is simulated flow using a lattice Boltzmann (LB) approach and the scalar transport is simulated using a set of distribution functions referred to herein as the scalar transport equations.

While a detailed description of the LBM method for simulating fluid flow is provided herein, below is an example of one approach for simulating fluid flow that can be used in conjunction with the scalar simulation:

$$f_i(x+c_i, t+1) = f_i(x, t) - \frac{1}{\tau}(f_i(x, t) - f_i^{eq}(x, t)) + g_i(x, t). \qquad \text{Eq. (38)}$$

Here $f_i(x,t)$, ($i=1, \ldots, 19$) is the particle distribution function, $\tau$ is the single relaxation time, and $f_i^{eq}(x, t)$ is the equilibrium distribution function with a third order expansion in fluid velocity, $$f_i^{eq}(x, t) = \rho w_i \left( 1 + \frac{c_i \cdot u}{T_0} + \frac{(c_i \cdot u)^2}{2T_0^2} - \frac{u^2}{2T_0} + \frac{(c_i \cdot u)^3}{6T_0^3} - \frac{c_i \cdot u}{2T_0^2} u^2 \right), \qquad \text{Eq. (39)}$$

where $T_0 = 1/3$. The discrete lattice velocities $c_i$ are:

$$c_i = \begin{cases} 0 \\ (\pm 1, 0, 0), (0, \pm 1, 0), (0, 0, \pm 1) \\ (\pm 1, \pm 1, 0), (\pm 1, 0, \pm 1), (0, \pm 1, \pm 1) \end{cases} \qquad \text{Eq. (40)}$$

with $w_o=1/3$ for rest particle, $w_i=1/18$ for states of Cartesian directions and $w_i=1/36$ for states of bi-diagonal directions. $g_i(x, t)$ is the external body force term. The hydrodynamic quantities $\rho$ and $u$ are moments of the particle distribution function:

$$\rho(x, t) = \sum_i f_i(x, t), \qquad \text{Eq. (41)}$$

$$\rho(x, t)u(x, t) = \sum_i c_i f_i(x, t).$$

As noted above, the fluid solver is used in conjunction with a scalar transport solver that generated scalar transport information. Thus, in addition to the fluid solver, a separate set of distribution functions, $T_i$, is introduced for scalar transport. Thus, for each voxel in a system, the system simulates both fluid flow and scalar transport to generate a state vector representing the fluid flow and a scalar quantity representing the scalar variable. These simulated results are stored as entries a computer accessible medium.

The set of scalar transport functions provides an indirect way of solving a second order macroscopic scalar transport equation. $T_i$ provides an equation modeling a dynamic evolution of a scalar quantity:

$$T_i(x+c_i, t+1) = T(x, t) + \left(1 - \frac{1}{T_T}\right)\Phi_i(x, t) \qquad \text{Eq. (42)}$$

$$\Phi_i(x, t) = \frac{c_i - u(x, t)}{\rho(x, t)T_0} \cdot \sum_j c_j f_j(x, t)(T_j(x, t) - T(x, t)) \qquad \text{Eq. (43)}$$

$$T(x, t) = \frac{\sum_i f_i(x, t)T_i(x, t)}{\rho(x, t)} \qquad \text{Eq. (44)}$$

$T_i$ is the scalar distribution function and $T$ is the scalar being solved for. $\tau T$ is the relaxation time correspond to scalar diffusivity. The relaxation time provides a measure of how long it would take for the system to relax to equilibrium. The $f_i$, $\rho$, $T_o$ and $u$ are defined in equations (38), (39) and (41), respectively.

The lattice speed set, represented by $c_i$, can be a discrete set of lattice speeds for use in the scalar simulation. In general the lattice speed set for scalar distribution does not need to be the same as the lattice speed set for fluid distribution because the scalar solver is an additional system attached to the basic fluid solver. For example, fewer lattice speeds can be used in the simulation of the scalar evolution than in the simulation of the fluid flow. A different lattice speed set for scalar could be applied as long as the scalar lattice speed set is a subset of the fluid lattice speed set. For example, a 6-speed LB model may be used for scalar simulation when the 19-speed LB model is used for fluid simulation. Since the 19-speed LB model has a higher order lattice symmetry than the 6-speed LB model, the same 19-speed lattice model for scalar is used in the examples provided below.

The standard, well-known BGK (e.g., as noted above), includes non-equilibrium moments of all orders. It is believed that including all non-equilibrium moments is not necessary isotropic, hydrodynamic, or physically meaningful. Thus, a BGK regularized/filtered collision operator form is used. A collision operator, $\Phi_i$, represents a future collision factor. This collision operator extracts the non-equilibrium scalar properties at only the relevant supported orders (e.g., only the first order). The operator also preserves and relaxes the modes of interest while the non-equilibrium properties associated with the unsupported/undesirable higher order modes are removed. This projection is sufficient for the recovery of the scalar transport physics (e.g., advection and diffusion). Use of this future collision operator is believed to significantly reduce the noise, provides better advection behavior (e.g., can be more Gallidean invariant), and is believed to be more stable than other solutions as compared to other solutions of the well-known BGK operator. Such a form (e.g., as shown in eqn. 43) ensures that only the first order non-equilibrium moment contributes to scalar diffusion in hydrodynamic range. All non-equilibrium moments of higher orders are filtered out by this collision process. Use of the collision operator, $\Phi_i$, as described above is believed to provide benefits including elimination of numerical noise exhibited in BGK and improved robustness. The scalar T serves as its own equilibrium and no complicated expression of scalar equilibrium distribution function is needed. The overall calculation of collision operator $\Phi_i$ is rather efficient. It is believed that filtering the higher order non-equilibrium moments can additionally provide the advantage of reducing aliasing that can exist in the higher order equilibrium solutions.

It can be shown that the collision in (42) obeys the scalar conservation law. Multiplying $f_i'(x,t)=f_i(x+c_i,t+1)$ on both sides of equation (42) and noticing:

$$\sum_i \frac{(c_i - u)f_i'}{\rho T_0} = \frac{\rho u - \rho u}{\rho T_0} = 0, \quad \text{Eq. (45)}$$

Results in $$\sum_i f_i' T_i' = \sum_i f_i' T = \rho T \quad \text{Eq. (46)}$$

where $T_i'(x, t)$ denotes the right hand side of equation (42). Hence the scalar collision operator conserves local $\rho T$ which implies realization of local energy conservation if the scalar is considered as temperature. Since $T_i$ propagates along with $f_i$, the energy distribution $E_i = f_i T_i$ is fully maintained during advection. The global conservation of $\rho T$ is therefore achieved. Furthermore, and most notably, this scheme maintains the exact invariance on uniformity of scalar T. This is straightforward to see, that if $T_i(x,t)-T(x,t)=T=const$ everywhere, then $\phi(x,t)=0$ and $T_i(x,t+1)=T$ everywhere at all later times, regardless of the background flow field. This fundamental property is not demonstrated in any previous lattice Boltzmann scalar models.

Using Chapmann-Enskog expansion, it can be shown that equation (42) recovers the following second order macroscopic scalar transport equation:

$$\frac{\partial \rho T}{\partial t} + \nabla \cdot (\rho u T) = \nabla \cdot \rho \kappa \nabla T \quad \text{Eq. (47)}$$

With $\kappa=(\tau_T-\frac{1}{2})T_0$. The uniformity invariance condition ensures that $\rho\square$ is outside of $\nabla T$.

Boundary Condition

One substantial advantage of LBM is the capability of dealing with complex geometry. In a generalized volumetric LB surface algorithm to achieve frictionless/frictional boundary conditions (BC) on arbitrary geometry, mass is conserved and both tangential and normal momentum fluxes on the boundary are precisely realized. The local detailed balance is fully satisfied. An adiabatic (zero scalar flux) BC on arbitrary geometry for scalar can be derived as a direct extension of this approach. Once the adiabatic BC is realized, a prescribed finite flux BC can be accomplished.

Figure 14:
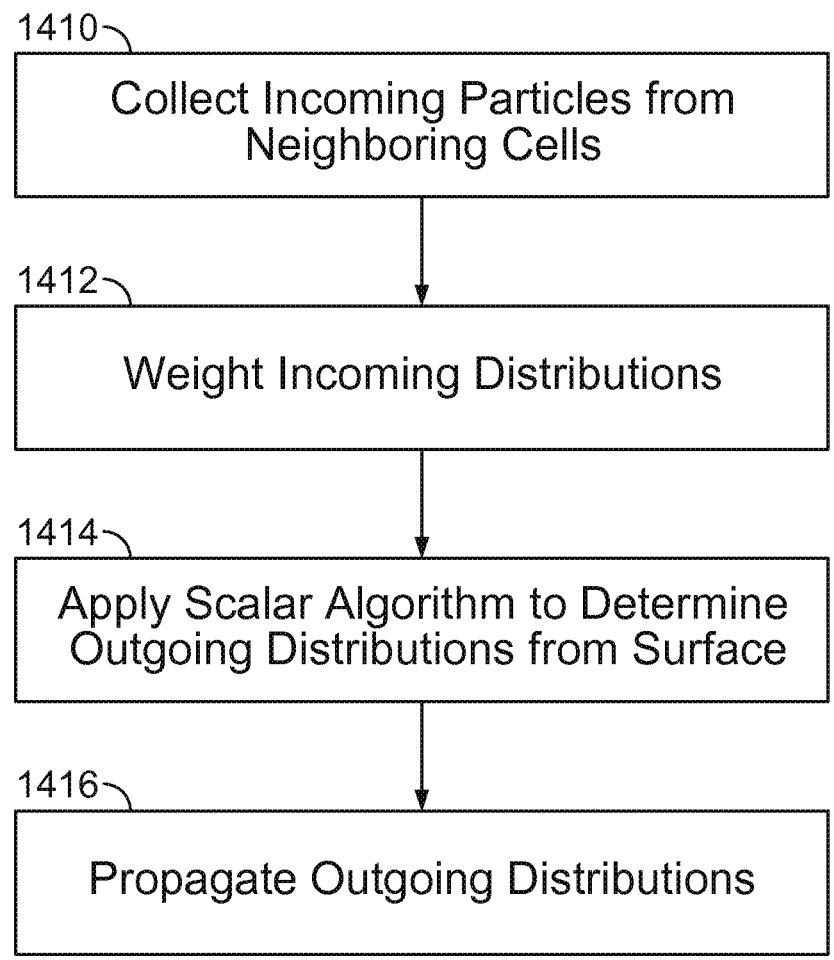
FIG. 14 is a flow chart of a procedure for simulating scalar transport.
Figure 15:
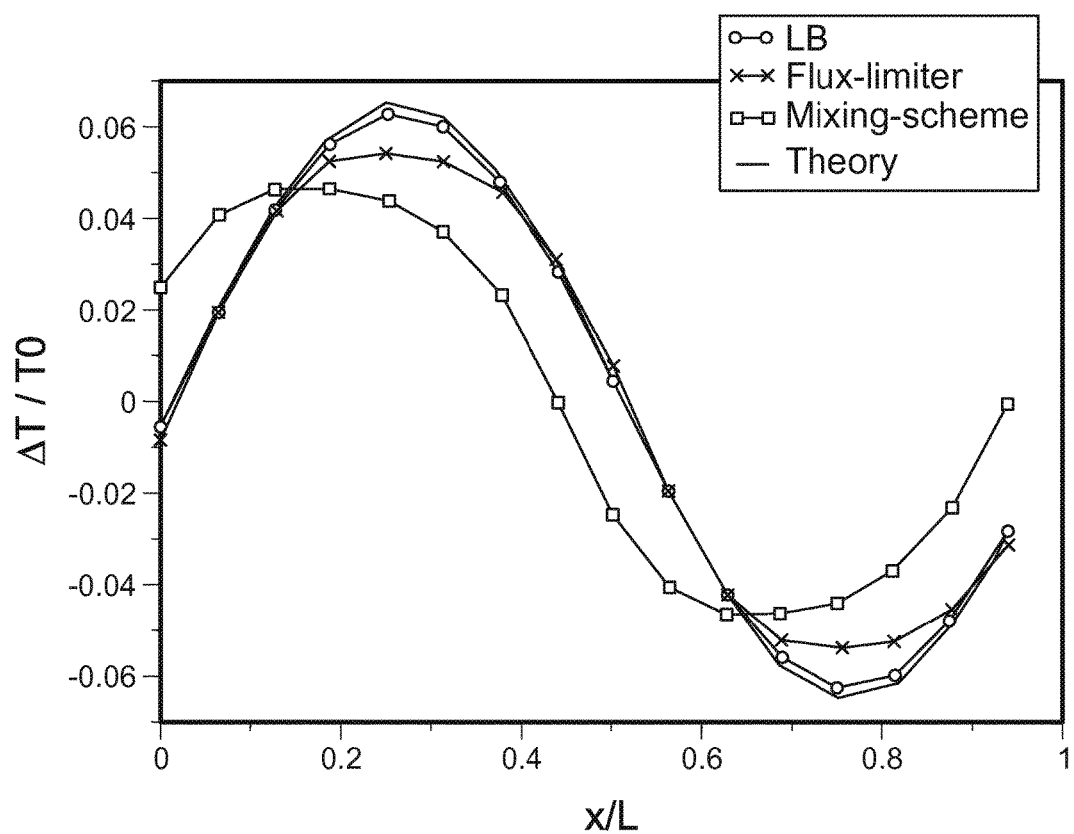
FIG. 15 illustrates a simulated temperature profile.

Unlike other point-wise LB, boundary conditions are conducted on a discretized set of surface elements. These piece-wise flat surface elements together represent a curved geometry. During particle advection, as shown in FIG. 14, each surface element collects incoming particles from its neighboring fluid cells (step 1410). The incoming distributions $f_i^{in}$, $T_i^{in}$, are weighted by volume overlapping of parallelepipeds from the underling surface element with cells in particle moving directions (step 1412). After receiving the incoming quantities, the following surface scalar algorithm is applied (step 1414). To determine the outgoing distributions from the surface, $$T_{i^*}^{out}=T^{in}-(f_i^{in}T_i^{in}-f_i^{in}T^{in})/f_{i^*}^{out}, \quad \text{Eq. (48)}$$

Where $$T^{in} = \frac{\sum_{c_i \cdot n<0} f_i^{in} T_i^{in} P_i}{\sum_{c_i \cdot n<0} f_i^{in} P_i}. \quad \text{Eq. (49)}$$

Here n is the surface normal pointing towards fluid domain and $c_i \cdot n<0$, $c_{i^*}=-c_i$. $P_i(=|n\square c_i|A)$ is the volume of parallelepiped in particle direction $c_i$ associated with the surface normal n and area A of a given surface element, and obviously $P_i=P_{i^*}$. Finally, the outgoing distributions are propagated back from the surface element to fluid cells according to the same surface advection process (step 1416). It is not difficult to show that the above surface scalar collision achieves exact zero surface scalar flux. Taking summation over outgoing directions, the outgoing scalar flux is:

$$\sum_{c_i \cdot n<0} f_{i^*}^{out} T_{i^*}^{out} P_{i^*} = \sum_{c_i \cdot n<0} f_{i^*}^{out} T^{in} P_{i^*} - \sum_{c_i \cdot n<0} (f_i^{in} T_i^{in} - f_i^{in} T^{in}) P_i. \quad \text{Eq. (50)}$$

Note $P_i=P_{i^*}$ and the definition of $T^{in}$ in eqn (49), the second summation term on the right hand side is zero. In addition, because of the mass flux conservation $\sum_{c_i \cdot n<0} f_{i^*}^{out} P_{i^*} = \sum_{c_i \cdot n<0} f_i^{in} P_{i^*}$, the total outgoing scalar flux is the same as the total incoming scalar flux:

$$\sum_{c_i \cdot n<0} f_{i^*}^{out} T_{i^*}^{out} P_{i^*} = \sum_{c_i \cdot n<0} f_i^{in} T_i^{in} P_i. \quad \text{Eq. (51)}$$

Therefore zero net surface flux (adiabatic) BC is fully satisfied on arbitrary geometry.

If an external scalar source Q(t) is specified on the surface, a source term can be directly added to equation (48)

$$\frac{Q(t) P_i A}{\rho C_p \sum_{c_i \cdot n>0} P_i}. \quad \text{Eq. (52)}$$

If the boundary condition has a prescribed scalar quantity $T_w$ (for example surface temperature), surface heat flux can be calculated accordingly:

$$Q(t)=\rho C_p \kappa (T_w-T^{in}). \quad \text{Eq. (53)}$$

Numerical Verification

FIGS. 15-18 show four sets of simulation results that demonstrate the capability of the LB scalar solver regarding its numerical accuracy, stability, Galilean invariance, grid orientation independence and etc. Results using two different 2nd order FD schemes, van Leer type of flux limiter scheme and direct mixing scheme (mixture of central and first order upwind schemes) are also presented as comparisons.

A. Shearwave Decay

The first test case is a temperature shearwave decay carried by a constant uniform fluid flow. The initial temperature distribution is a uniform one plus a spatial sinusoidal variation with lattice wavelength L=16 and magnitude $\delta=6.67\%$: $T(x)=T_A(1+\delta \sin(2\Pi x/L))$. $T_A$ is a constant. The velocity of background mean flow is 0.2 and the thermal diffusivity $\kappa$ is 0.002. With such a low resolution and $\kappa$, the numerical stability and accuracy can be well validated. For temperature decay without background flow, both the LB scalar solver and the finite difference methods show excellent agreements with theory. With nonzero background mean flow, the LB scalar solver is still able to accurately compare with theory. However, the FD results show noticeable numerical errors. The temperature profiles at lattice time step 81 are plotted in FIG. 15. Numerical diffusion is seen clearly for the flux-limiter FD scheme, while neither the correct temperature profile nor its location can be maintained by the mixing FD scheme.

B. Inclined Channel with Volume Heat Source

Figure 16:
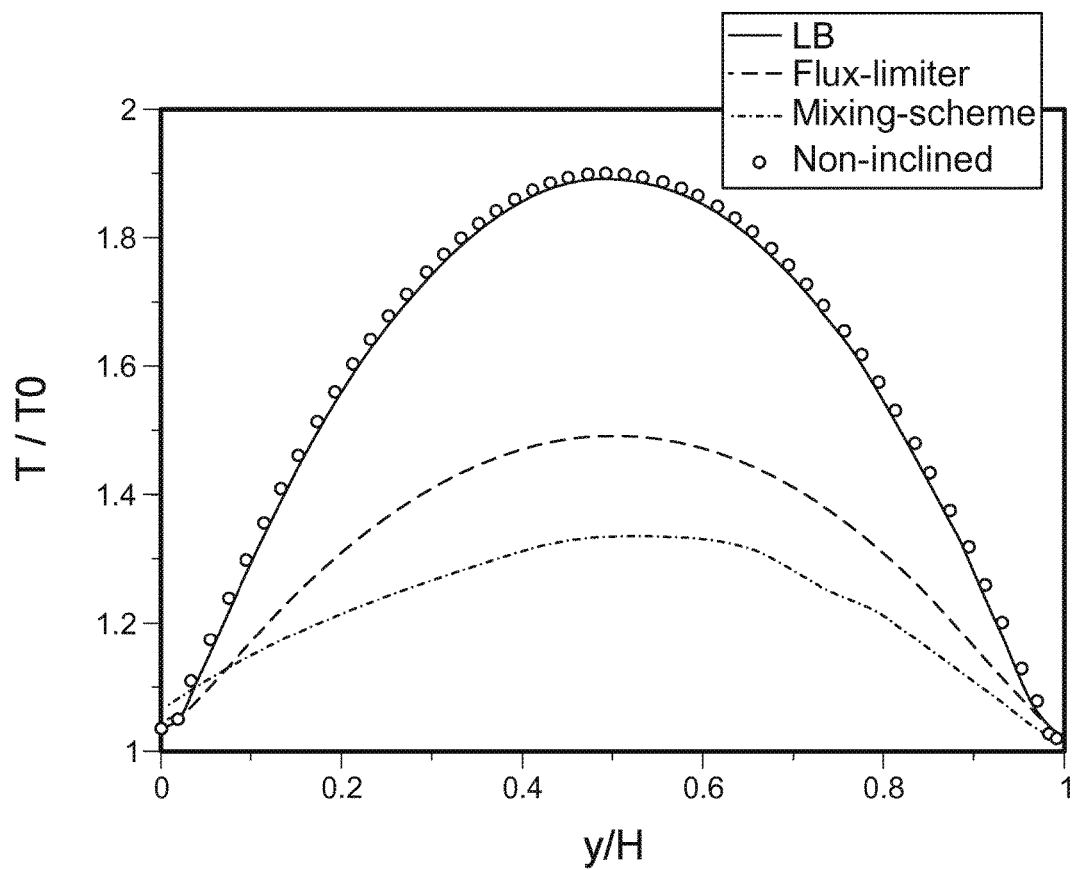
FIG. 16 illustrates a simulated temperature distribution across a tilted channel.

The second test case is a simulation of temperature distribution in a channel flow with different lattice orientations. The channel walls are free-slip, and the fluid flow stays uniform with $U_0=0.2$ as a result. The channel width is 50 (lattice spacing) and the flow Re is 2000. The thermal diffusivity $\kappa$ is 0.005. The temperature on the wall is fixed at Tw=⅓. A constant volume heat source $q=5\times10^{-6}$ is applied in the bulk fluid domain. The flow has periodic boundary condition in the streamwise direction, which is easy to realize in lattice aligned situation. When the channel (light color) is tilted as shown in FIG. 16, the in and out channel boundaries are matched perfectly in coordinate directions so that the periodic boundary condition is once again realized in the streamwise direction. In order to demonstrate lattice independence, we choose the tilted angle to be 26.56 degree. Like the first test case, the temperature distributions using LB scalar solver and the two FD schemes match analytic solution very well when the channel is lattice aligned. However, the results from the FD schemes depart significantly from theory when the channel is tilted. The simulation results of temperature distribution across the tilted channel are shown in FIG. 16. The LB results are clearly shown to be independent of lattice orientations. The errors from the FD methods are also originated from their fundamental difficulty in dealing with gradient calculation on a tilted boundary orientation, so that additional numerical artifacts are introduced. Since the LB scalar particle advection is exact with the BC presented here, it is thus able to achieve a lattice orientation independent scalar evolution.

C. Temperature Propagation in an Inclined Channel

Figure 17:
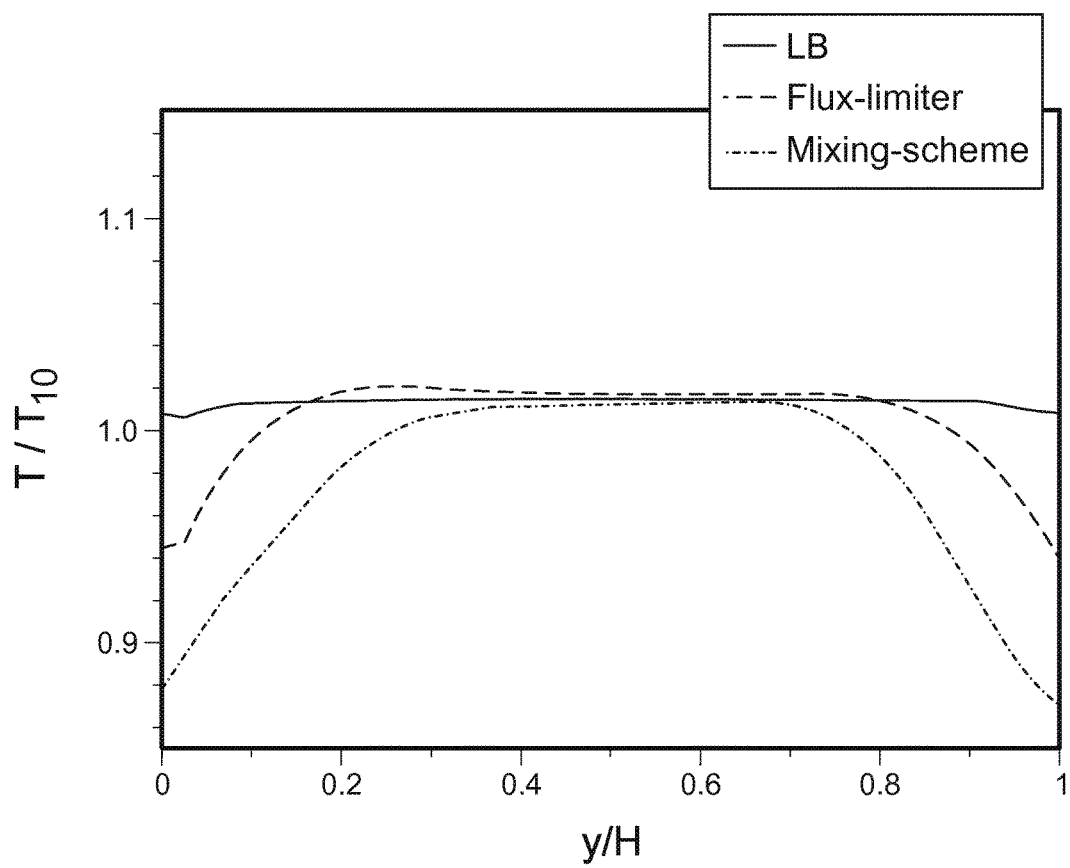
FIG. 17 illustrates simulated temperature propagation fronts.

Due to lack of neighbor information in a non-lattice aligned near wall region on Cartesian grids, it is extremely difficult to get accurate estimation of local gradients, which is essential for FD based methods. Furthermore, because of strong dependency on upwind information, the calculation of scalar advection can be further compromised for FD methods. In contrast, the boundary treatment of LB scalar solver achieves exact local scalar flux conservation as discussed above. The scalar advection in such a near wall region can be computed accurately. High temperature convection in a channel tilted by 30 degree is conducted as a demonstration. The free-slip and adiabatic BCs are enforced at solid walls and fluid velocity is constant U0=0.0909 along the channel. The thermal diffusivity $\kappa$ is 0.002. Initially the temperature is ⅓ everywhere except for T=⅔ at the inlet. Then this temperature front should be convected by the uniform background fluid flow to downstream locations at later times without distortion. The computed temperature front distributions across channel at lattice time step 2000 are shown in FIG. 17. The temperature front of LB scalar solver maintains a nearly straight profile. On the other hand, the temperature fronts from the two FD schemes are shown substantial distortions in near wall regions. It is also worth mentioning that the LB scalar result has shown the thinnest temperature front which implies that LB scalar solver has a smaller numerical diffusion.

D. Rayleigh-Bernard Natural Convection

Figure 18:
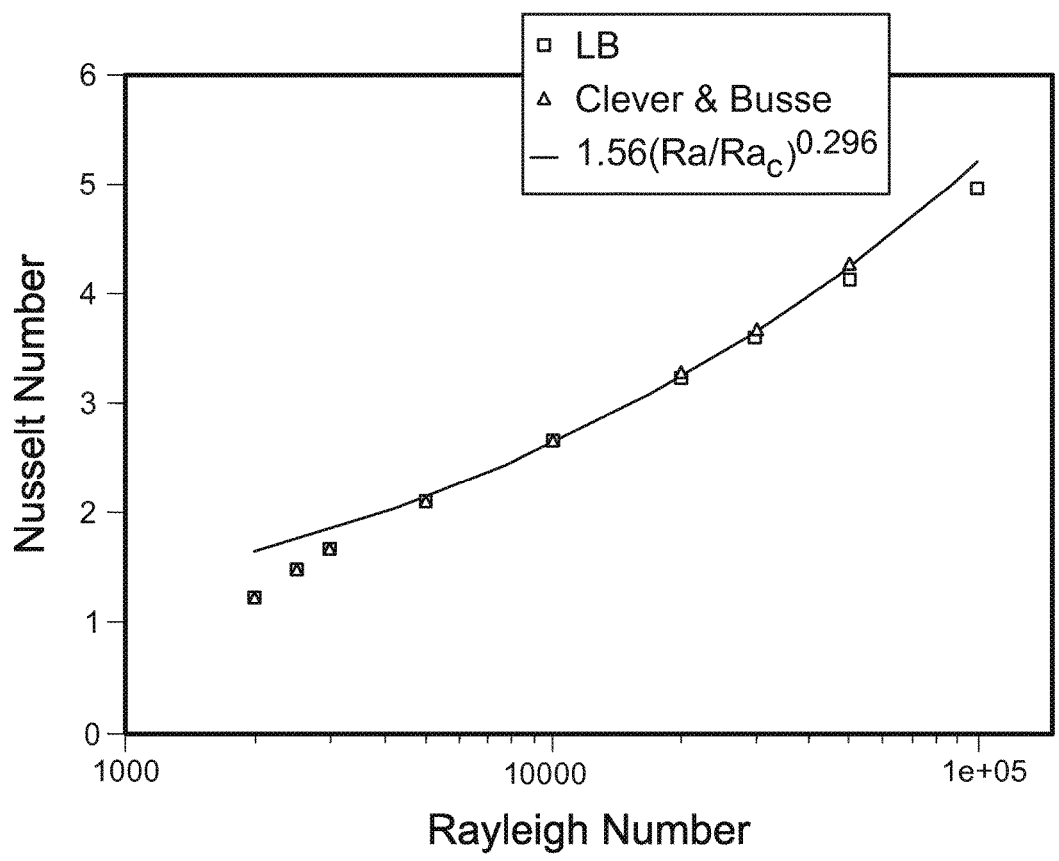
FIG. 18 illustrates a Nusselt number vs Ra number.

Rayleigh-Bernard (RB) natural convection is a classical benchmark for accuracy verification of numerical solvers. It has a simple case setup but complex physics phenomena. When Rayleigh number Ra exceeds certain critical value, the system experiences a transition from no-flow to convection. Current study, as shown in FIG. 18, is carried out under the Boussinesq approximation, in that the buoyancy force acting on the fluid is defined as $\alpha\rho g(T-T_m)$ where $\alpha$ is the thermal expansion rate, g is gravity, and Tm is the average temperature value of the top and bottom boundaries. Since the most unstable wave number is $k_c=3.117$ when the Ra exceeds the critical value $Ra_c=1707.762$, the resolution 101×50 is used in the study. Pr used here is 0.71. When RB convection is established, the heat transfer between two plates is greatly enhanced. The enhancement of the heat transfer is described by $Nu=1+<u_yT>H/\kappa\Delta T$.

A number of implementations have been described. Nevertheless, it will be understood that various modifications may be made without departing from the spirit and scope of the claims. Accordingly, other implementations are within the scope of the following claims.

What is claimed is:

1. A computer implemented method for determining a distribution of a physical scalar quantity within a volume, the method comprising:
   representing a volume as a set of state vectors for voxels in the volume, with the state vectors comprising entries that correspond to particular momentum states at a corresponding voxel to provide a simulation space;
   simulating, by the computer based at least in part on a first collision operator, activity of a fluid flow in the volume, the activity of the fluid flow being simulated to model movement of elements within the volume, with the movement of the elements causing collisions among the elements and with simulating further comprising:
       performing interaction operations on the state vectors, the interaction operations modeling interactions between elements of different momentum states according to a model; and
       performing first move operations of the set of state vectors to reflect movement of elements to new voxels in the simulation space according to the model;
   simulating, by the computer based at least in part on a second collision operator, a time evolution of a scalar quantity in the simulation space, which scalar quantity is selected from the group consisting of temperature and concentration, and which the second collision operator filters out non-equilibrium moments higher than the first order; and
   storing, in the computer accessible memory, a set of scalar quantities for voxels in the simulation space, each of the scalar quantities comprising an entry that corresponds to the simulated scalar quantity at a corresponding voxel.

2. The method of claim 1, wherein:
   simulating the fluid flow comprises simulating the fluid flow based in part on a first set of discrete lattice speeds; and
   simulating the time evolution of the scalar quantity comprises simulating the time evolution of the scalar quantity based in part on a second set of discrete lattice speeds, the second set of discrete lattice speeds comprising fewer lattice speeds than the first set of discrete lattice speeds.

3. The method of claim 1, wherein:
simulating the fluid flow comprises simulating the fluid flow based in part on a first set of discrete lattice speeds; and
simulating the time evolution of the scalar quantity comprises simulating the time evolution of the scalar quantity based in part on a second set of discrete lattice speeds, the second set of discrete lattice speeds comprising the same lattice speeds than the first set of discrete lattice speeds.

4. The method of claim 1, wherein the physical scalar distribution is a convective temperature distribution or a chemical distribution within a volume that includes a source of heat or a source of the chemical.

5. The method of claim 1, wherein the second collision operator filters out all non-equilibrium moments of second order and higher.

6. The method of claim 1, wherein simulating the time evolution of the scalar quantity comprises:
collecting incoming distributions from neighboring cells;
weighting the incoming distributions;
applying a scalar algorithm to determine outgoing distributions; and
propagating the determined outgoing distributions.

7. The method of claim 6, further comprising applying a zero net surface flux boundary condition such that the incoming distributions are equal to the determined outgoing distributions.

8. The method of claim 6, wherein determining the outgoing distributions comprises determining the outgoing distributions to provide a zero surface scalar flux.

9. The method of claim 1, wherein the scalar quantity comprises a scalar quantity selected from the group consisting of temperature, concentration, and density.

10. The method of claim 1, wherein simulating the time evolution of the scalar quantity indirectly solves a macroscopic scalar transport equation, which comprises satisfying an exact invariance on uniformity of the scalar.

11. The method of claim 10, wherein the macroscopic scalar transport equation comprises:

$$\frac{\partial \rho T}{\partial t} + \nabla \cdot (\rho u T) = \nabla \cdot \rho \kappa \nabla T.$$

12. The method of claim 1, wherein simulating the time evolution of the scalar quantity comprises simulating a particle distribution function.

13. The method of claim 1, wherein simulating the time evolution of the scalar quantity comprises determining macroscopic fluid dynamics by solving mesoscopic kinetic equations based at least in part on a Boltzmann equation.

14. The method of claim 1, wherein the volume includes a source of the physical scalar quantity, with the method further comprising:
storing and/or displaying results of simulating by the first and/or the second collision operators.

15. The method of claim 1, wherein simulating the time evolution of the scalar quantity comprises satisfying a local energy conservation condition.

16. The method of claim 15, wherein satisfying the local energy conservation condition comprises satisfying the local energy conservation condition in a fluid domain internal to the simulation space and at a boundary of the simulation space.

17. A non-transitory computer storage medium encoded with computer program instructions for determining a distribution of a physical scalar quantity within a volume, with the computer program instructions when executed by one or more computers cause the one or more computers to:
represent a volume as a set of state vectors for voxels in the volume, with the state vectors comprising entries that correspond to particular momentum states at a corresponding voxel to provide a simulation space divided into grid cells, wherein the size of a grid cell depends in part on objects within the simulation space;
simulate based at least in part on a first collision operator activity of a fluid flow in the volume to model movement of elements within the volume, with the movement of the elements causing collisions among the elements and with the instructions to simulate further comprising instructions to:
perform interaction operations on the state vectors, the interaction operations modeling interactions between elements of different momentum states according to a model; and
perform first move operations of the set of state vectors to reflect movement of elements to new voxels in the simulation space according to the model;
simulate based at least in part on a second collision operator, a time evolution of a scalar quantity in the simulation space, which scalar quantity is selected from the group consisting of temperature and concentration, and with the second collision operator filtering out non-equilibrium moments higher than the first order;
store a set of scalar quantities for voxels in the simulation space, each of the scalar quantities comprising an entry that corresponds to the simulated scalar quantity at a corresponding voxel.

18. The non-transitory computer storage medium of claim 17 wherein:
causing the computer to simulate the fluid flow comprises causing the computer to simulate the fluid flow based in part on a first set of discrete lattice speeds; and
causing the computer to simulate the time evolution of the scalar quantity comprises causing the computer to simulate the time evolution of the scalar quantity based in part on a second set of discrete lattice speeds, the second set of discrete lattice speeds comprising fewer lattice speeds than the first set of discrete lattice speeds.

19. The non-transitory computer storage medium of claim 17 wherein:
causing the computer to simulate the fluid flow comprises causing the computer to simulate the fluid flow based in part on a first set of discrete lattice speeds; and
causing the computer to simulate the time evolution of the scalar quantity comprises causing the computer to simulate the time evolution of the scalar quantity based in part on a second set of discrete lattice speeds, the second set of discrete lattice speeds comprising the same lattice speeds than the first set of discrete lattice speeds.

20. The non-transitory computer storage medium of claim 17, wherein the physical scalar distribution is a convective temperature distribution or a chemical distribution within a volume that includes a source of heat or a source of the chemical.

21. The non-transitory computer storage medium of claim 17, wherein the second collision operator filters out all non-equilibrium moments of second order and higher.

22. The non-transitory computer storage medium of claim 17, wherein causing the computer to simulate the time evolution of the scalar quantity comprises causing the computer to:
collect incoming distributions from neighboring cells;
weight the incoming distributions;
apply a scalar algorithm to determine outgoing distributions; and
propagate the determined outgoing distributions.

23. The non-transitory computer storage medium of claim 22, further configured to cause a computer to apply a zero net surface flux boundary condition such that the incoming distributions are equal to the determined outgoing distributions.

24. The non-transitory computer storage medium of claim 22, wherein causing the computer to determine the outgoing distributions comprises causing the computer to determine the outgoing distributions to provide a zero surface scalar flux.

25. The non-transitory computer storage medium of claim 17, wherein the scalar quantity comprises a scalar quantity selected from the group consisting of temperature, concentration, and density.

26. The non-transitory computer storage medium of claim 17, wherein causing the computer to simulate the time evolution of the scalar quantity indirectly solves a macroscopic scalar transport equation, which comprises causing the computer to satisfy an exact invariance on uniformity of the scalar.

27. The non-transitory computer storage medium of claim 26, wherein the macroscopic scalar transport equation comprises:

$$\frac{\partial \rho T}{\partial t} + \nabla \cdot (\rho u T) = \nabla \cdot \rho \kappa \nabla T.$$

28. The non-transitory computer storage medium of claim 17, wherein causing the computer to simulate the time evolution of the scalar quantity comprises causing the computer to simulate a particle distribution function.

29. The non-transitory computer storage medium of claim 17, wherein causing the computer to simulate the time evolution of the scalar quantity comprises causing the computer to determine macroscopic fluid dynamics by solving mesoscopic kinetic equations based at least in part on the Boltzmann equation.

30. The non-transitory computer storage medium of claim 17, wherein the volume includes a source of the physical scalar quantity, and the medium further comprising instructions to:
store and/or display results of simulating by the first and/or the second collision operators.

31. The non-transitory computer storage medium of claim 17, wherein causing the computer to simulate the time evolution of the scalar quantity comprises causing the computer to satisfy a local energy conservation condition.

32. The non-transitory computer storage medium of claim 31, wherein causing the computer to satisfy the local energy conservation condition comprises causing the computer to satisfy the local energy conservation condition in a fluid domain internal to the simulation space and at a boundary of the simulation space.

33. A computer system for simulating a physical process fluid flow, the system being configured to:
represent a volume as a set of state vectors for voxels in the volume, with the state vectors comprising entries that correspond to particular momentum states at a corresponding voxel to provide a simulation space divided into grid cells, wherein the size of a grid cell depends in part on objects within the simulation space;
simulate based at least in part on a first collision operator, activity of a fluid flow in a volume to model movement of elements within the volume, with the movement of the elements causing collisions among the elements and with the instructions to simulate further comprising instructions to:
perform interaction operations on the state vectors, the interaction operations modeling interactions between elements of different momentum states according to a model; and
perform first move operations of the set of state vectors to reflect movement of elements to new voxels in the simulation space according to the model;
simulate based at least in part on a second collision operator, a time evolution of a scalar quantity in the simulation space, which scalar quantity is selected from the group consisting of temperature and concentration, and with the second collision operator filtering out non-equilibrium moments higher than the first order; and
store a set of scalar quantities for grid cells in the simulation space, each of the scalar quantities comprising an entry that corresponds to the simulated scalar quantity at a corresponding voxel.

34. The system of claim 33, wherein:
the system configured to:
simulate the fluid flow further comprises simulate the fluid flow based in part on a first set of discrete lattice speeds; and
simulate the time evolution of the scalar quantity further comprises simulate the time evolution of the scalar quantity based in part on a second set of discrete lattice speeds, the second set of discrete lattice speeds comprising fewer lattice speeds than the first set of discrete lattice speeds.

35. The system of claim 33, wherein:
the system configured to:
simulate the fluid flow further comprises simulate the fluid flow based in part on a first set of discrete lattice speeds; and
simulate the time evolution of the scalar quantity further comprises simulate the time evolution of the scalar quantity based in part on a second set of discrete lattice speeds, the second set of discrete lattice speeds comprising the same lattice speeds than the first set of discrete lattice speeds.

36. The system of claim 33, wherein the physical scalar distribution is a convective temperature distribution or a chemical distribution within a volume that includes a source of heat or a source of the chemical.

37. The system of claim 33, wherein the second collision operator filters out all non-equilibrium moments of second order and higher.

38. The system of claim 33, wherein the system configured to: simulate the time evolution of the scalar quantity further comprises:
collect incoming distributions from neighboring cells;
weight the incoming distributions;

apply a scalar algorithm to determine outgoing distributions; and
propagate the determined outgoing distributions.

39. The system of claim 38, further configured to apply a zero net surface flux boundary condition such that the incoming distributions are equal to the determined outgoing distributions.

40. The system of claim 38, wherein the system configured to determine the outgoing distributions further comprises determine the outgoing distributions to provide a zero surface scalar flux.

41. The system of claim 33, wherein the scalar quantity comprises a scalar quantity selected from the group consisting of temperature, concentration, and density.

42. The system of claim 33, wherein the system configured to simulate the time evolution of the scalar quantity, indirectly solves a macroscopic scalar transport equation, which comprises satisfying an exact invariance on uniformity of the scalar.

43. The system of claim 42, wherein the macroscopic scalar transport equation comprises:

$$\frac{\partial \rho T}{\partial t} + \nabla \cdot (\rho u T) = \nabla \cdot \rho \kappa \nabla T.$$

44. The system of claim 33, wherein the system configured to simulate the time evolution of the scalar quantity further comprises simulate a particle distribution function.

45. The system of claim 33, wherein the system configured to simulate the time evolution of the scalar quantity further comprises determine macroscopic fluid dynamics by solving mesoscopic kinetic equations based at least in part on the Boltzmann equation.

46. The system of claim 33, wherein the volume includes a source of the physical scalar quantity, with the system further configured to:

store and/or display results of simulating by the first and/or the second collision operators.

47. The system of claim 33, wherein the system configured to simulate the time evolution of the scalar quantity further comprises satisfy a local energy conservation condition.

48. The system of claim 47, wherein the system configured to satisfy the local energy conservation condition further comprises to satisfy the local energy conservation condition in a fluid domain internal to the simulation space and at a boundary of the simulation space.

* * * * *

UNITED STATES PATENT AND TRADEMARK OFFICE
CERTIFICATE OF CORRECTION

PATENT NO. : 10,360,324 B2  
APPLICATION NO. : 13/483676  
DATED : July 23, 2019  
INVENTOR(S) : Hudong Chen, Raoyang Zhang and Hongli Fan Page 1 of 1

It is certified that error appears in the above-identified patent and that said Letters Patent is hereby corrected as shown below:

On the Title Page

(75) Inventors: delete "Hudong Chen, Newton, MA (US); Raoyang Zhang, Burlington, MA (US)"

And replace with -- Hudong Chen, Newton, MA (US); Raoyang Zhang, Burlington, MA (US); Hongli Fan, Bellevue, WA (US) --

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*